United States Patent
Hiremath et al.

(10) Patent No.: US 9,807,165 B1
(45) Date of Patent: Oct. 31, 2017

(54) UNIFIED AND SECURED ENTERPRISE MOBILITY PLATFORM

(71) Applicant: EMC Corporation, Hopkinton, MA (US)

(72) Inventors: Prakash S. Hiremath, Bangalore (IN); Barun Pandey, Bangalore (IN); Shalini Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 321 days.

(21) Appl. No.: 14/583,369

(22) Filed: Dec. 26, 2014

(51) Int. Cl.
*G06F 17/30* (2006.01)
*H04L 29/08* (2006.01)
*H04L 29/06* (2006.01)

(52) U.S. Cl.
CPC .... *H04L 67/1095* (2013.01); *G06F 17/30174* (2013.01); *H04L 63/1441* (2013.01); *H04L 65/403* (2013.01)

(58) Field of Classification Search
CPC combination set(s) only.
See application file for complete search history.

(56) References Cited

U.S. PATENT DOCUMENTS

2012/0259927 A1* 10/2012 Lockhart ............... H04L 51/10
709/206
2012/0284637 A1* 11/2012 Boyer .................. G06Q 10/109
715/751
2013/0241719 A1* 9/2013 Biswas ................. G06F 19/322
340/407.1
2015/0127804 A1* 5/2015 Kripalani ............... H04L 43/10
709/224
2015/0355946 A1* 12/2015 Kang .................... G06F 9/5072
718/104

OTHER PUBLICATIONS

Cisco.com, "Cisco Enterprise Mobility Services Platform," http://www.cisco.com/c/en/us/products/wireless/enterprise-mobility-services-platform/index.html, retrieved Dec. 1, 2014, 2 pages.
Wikipedia.com, "Converged Infrastructure," http://en.wikipedia.org/wiki/Converged_infrastructure, Dec. 7, 2014, 4 pages, (retrieved Dec. 15, 2014).
VCE.com, "Converged Infrastructure," http://www.vce.com/resource-pages/converged-infrastructure, retrieved Dec. 15, 2014, 1 page.

(Continued)

*Primary Examiner* — Shyue Jiunn Hwa
(74) *Attorney, Agent, or Firm* — Ryan, Mason & Lewis, LLP

(57) ABSTRACT

Techniques for providing a unified and secured enterprise mobility platform. For example, a method comprises implementing a mobile device management component, a mobile application management component, a file syncing component and a file sharing component on a unified platform, and managing interactions between at least two of the mobile device management component, the mobile application management component, the file syncing component and the file sharing component on the unified platform. The method may further comprise implementing a mobile analytics component, a mobile security component and a mobile application container on the unified platform.

20 Claims, 5 Drawing Sheets

(56) References Cited

OTHER PUBLICATIONS

Wikipedia.com, "Documentum," http://en.wikipedia.org/wiki/Documentum#Documentum_Content_Server_.28core_product.29, Aug. 1, 2014, 10 pages (retrieved Dec. 1, 2014).

T. McClure et al., "Enterprise File Sync-and-Share Applications," http://searchcloudstorage.techtarget.com/feature/Enterprise-file-sync-and-share-applications, Jul. 2013, 4 pages (retrieved Dec. 3, 2014).

Syncplicity.com, "Features: Collaborate and Share Files Anywhere," https://www.syncplicity.com/features/, retrieved Dec. 3, 2014, 9 pages.

M. Rouse, "Mobile Application Management (MAM)," http://searchconsumerization.techtarget.com/definition/mobile-application-management, Jun. 23, 2014, 1 page, (retrieved Dec. 3, 2014).

V. Beal, "Mobile Device Management-MDM," http://www.webopedia.com/TERM/M/mobile_device_management.html, retrieved Dec. 3, 2014, 2 pages.

Wikipedia.com, "Mobile Security," http://en.wikipedia.org/wiki/Mobile_security, Nov. 18, 2014, 21 pages, (retrieved Dec. 3, 2014).

Wikipedia.com, "Mobile Web Analytics," http://en.wikipedia.org/wiki/Mobile_web_analytics, Jul. 15, 2014, 5 pages (retireved Dec. 3, 2014).

Air-Watch.com, "AirWatch Mobile Application Management," http://www.air-watch.com/solutions/mobile-application-management, retrieved Dec. 3, 2014, 3 pages.

M. Rouse et al., "Mobile Security (Wireless Security)," http://whatis.techtarget.com/definition/mobile-security, Nov. 2012, 2 pages, (retrieved Dec. 3, 2014).

R. Mclaughlin, "Pros and Cons of Using Secure Containers for Mobile Device Security," http://searchconsumerization.techtarget.com/feature/Pros-and-cons-of-using-secure-containers-for-mobile-device-security, Apr. 9, 2014, 2 pages, (retrieved Dec. 1, 2014).

VCE.com, "Vblock Systems: The World's Most Advanced Converged Infrastructure," http://www.vce.com/asset/documents/value-brochure.pdf, retrieved Dec. 3, 2014, 4 pages.

\* cited by examiner

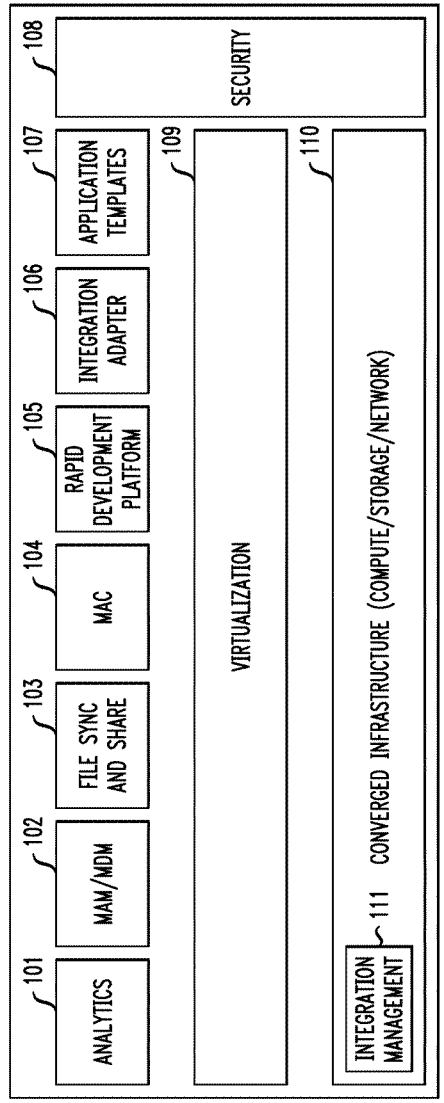

200

250

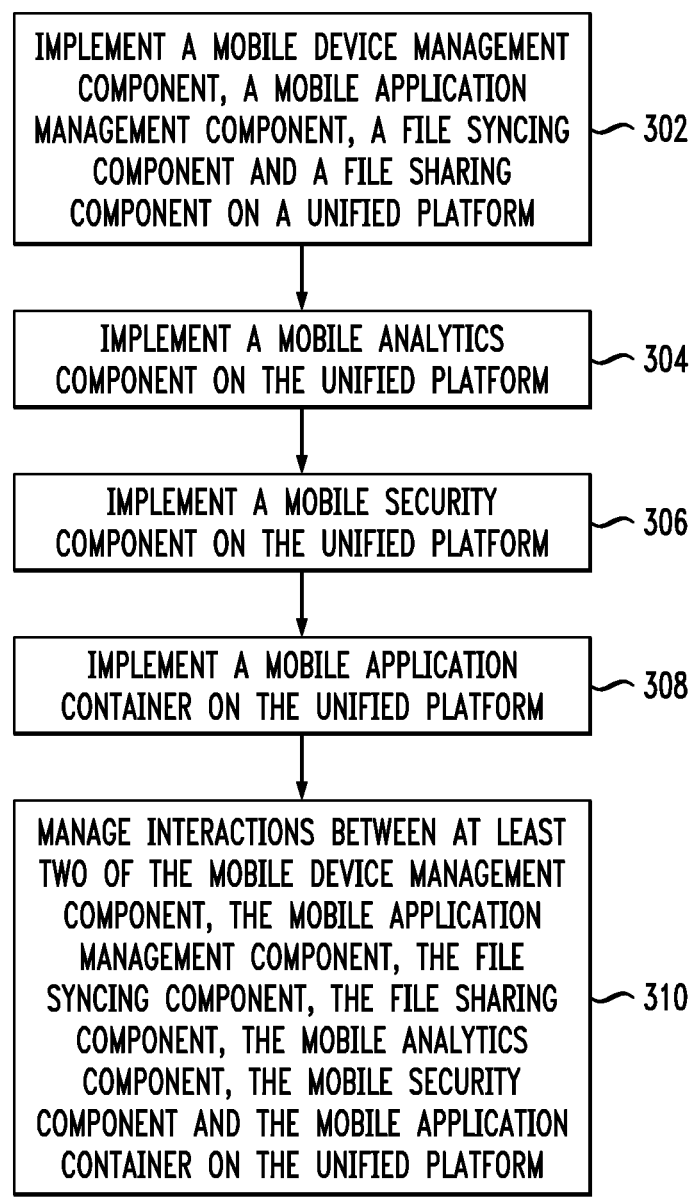

UNIFIED AND SECURED ENTERPRISE MOBILITY PLATFORM

FIELD

The field relates generally to enterprise mobility platforms, and more particularly to a unified and secured enterprise mobility platform.

BACKGROUND

An enterprise mobility platform supports the development of mobile applications, for example, business-relevant mobile applications, and can be based on a mobile application ecosystem that supports backend data integration, management, and development. An enterprise mobility platform can be deployed, for example, on site or hosted in the cloud.

An enterprise mobility platform can assist with using real-time data to monetize and influence customer behavior, integrating business applications and enterprise systems to create enterprise class mobile applications, and making mobility more secure with location and identity-based access integrated into the mobile applications.

Building an enterprise mobility platform requires considerable time and complex integrations across multiple vendor products. For example, security can be a challenge with multiple vendor solutions, as each vendor has its own preference. In addition, heterogeneous, disparate and/or non-secure products may lead to scenarios where more workforce is required to implement and maintain enterprise mobility solutions, and can result in loss of opportunities and a need to maintain multiple license and support contracts based on a number of vendors providing mobility solutions.

SUMMARY

Embodiments of the invention provide techniques for providing a unified and secured enterprise mobility platform with varying functionality.

For example, in one embodiment, a method comprises implementing a mobile device management component, a mobile application management component, a file syncing component and a file sharing component on a unified platform, and managing interactions between at least two of the mobile device management component, the mobile application management component, the file syncing component and the file sharing component on the unified platform. The method may further comprise implementing a mobile analytics component, a mobile security component and a mobile application container on the unified platform.

In another embodiment, an article of manufacture is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, embodiments of the present invention provide systems and methods for a unified and secured enterprise mobility platform which provides mobile device management (MDM), mobile application management (MAM), a mobile application container (MAC), file syncing and sharing, mobile analytics and mobile security on a unified platform. For example, in accordance with an embodiment of the present invention, a single vendor can provide each of the aforementioned capabilities on a single platform.

These and other features and advantages of the present invention will become more readily apparent from the accompanying drawings and the following detailed description.

BRIEF DESCRIPTION OF THE DRAWINGS

FIG. 1 is a block diagram illustrating an architecture for an enterprise mobility platform, according to an embodiment of the invention.

FIG. 3 is a flow chart showing a method for providing a unified and secured enterprise mobility platform, in accordance with an embodiment of the invention.

DETAILED DESCRIPTION

Figure 2A:
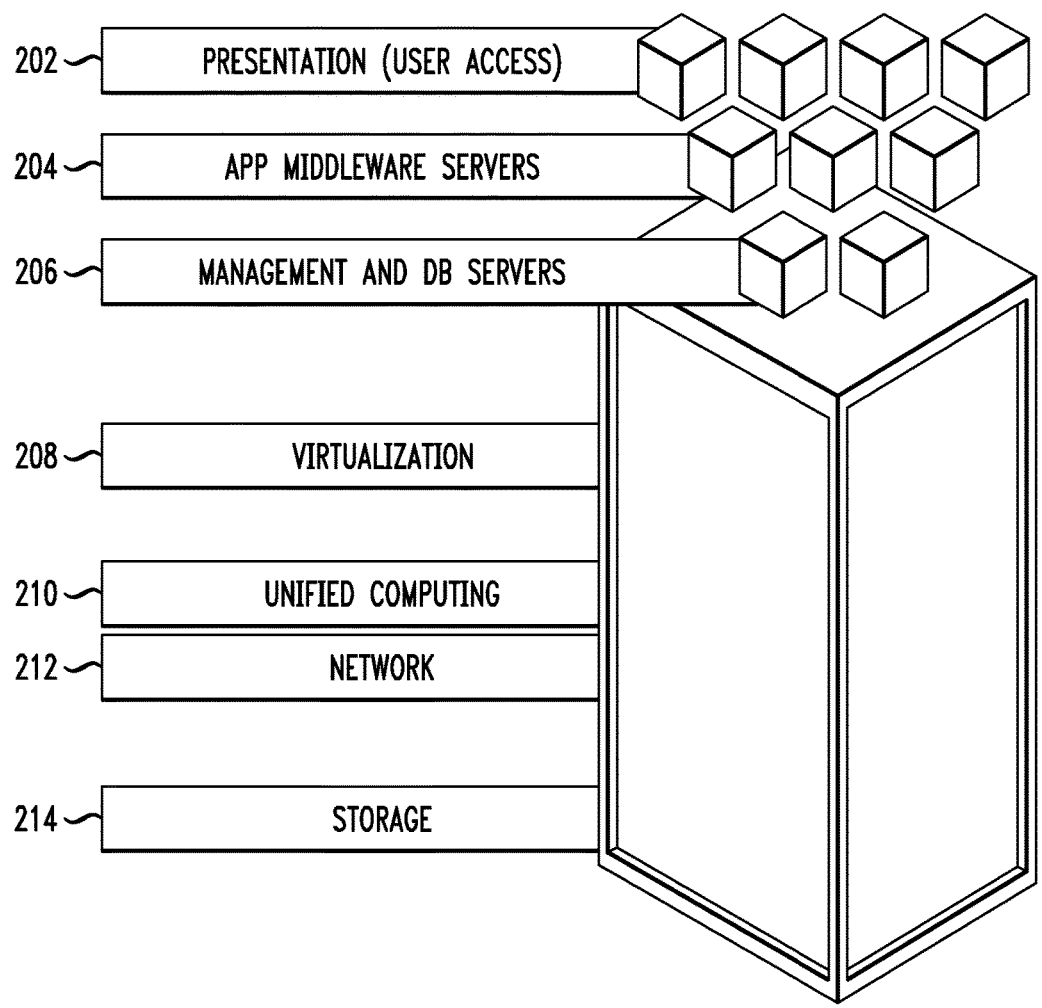
FIGS. 2A and 2B are block diagrams illustrating virtualization and converged infrastructure environments for an enterprise mobility platform, according to embodiments of the invention.

Embodiments of the invention will be described herein with reference to exemplary enterprise mobility platforms and associated servers, computers, storage units and devices and other processing devices. It is to be appreciated, however, that embodiments of the invention are not restricted to use with the particular illustrative system and device configurations shown. Moreover, the phrase "enterprise mobility platform" as used herein is intended to be broadly construed, so as to encompass, for example, private or public cloud computing systems, as well as other types of systems comprising distributed virtual infrastructure. However, a given embodiment may more generally comprise any arrangement of one or more processing devices.

As used herein, the term "platform" or "unified platform" refers to an architecture where multiple components, for example, software components, are able to converge and be executed by a single vendor or single entity in a single computing environment including the underlying hardware and/or software for a system.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "mobile device management (MDM)" refers to monitoring, managing and securing users' mobile devices being used in an organization, such as, for example, a business. The mobile devices can be deployed across multiple mobile service providers and across multiple mobile operating systems. Mobile device management software may be combined with additional security services and tools to create a mobile device and security enterprise mobility management solution. Mobile device management software can assist with device activation, enrollment and provisioning.

As used herein, the term "mobile application management (MAM)" refers to the delivery and administration of enterprise software to end users' corporate and personal mobile devices. Mobile application management software assists with software delivery, software licensing, configuration, application lifecycle management (ALM) and usage tracking. Some mobile application managers can also compare mobile device type and ownership to information technology (IT)-defined policies and limit how data can be shared among mobile applications. Mobile application management software can provide network administrators with the ability to wipe mobile applications and data from an end user's device remotely.

As used herein, the term "file sync and share" refers to functionality which enables users (e.g., employees) to use their own devices to access organizational data. File syncing and sharing can enable users to access files anywhere, anytime and from a variety of endpoint devices. Such services require IT professionals to balance business enablement with the ability to maintain the control and security of company data. Users with file sync and share accounts may be able to sync organizational data across multiple devices, such as a home computer, tablet or smartphone.

As used herein, the term "mobile analytics" refers to studying the behavior of mobile users, such as website visitors. With mobile analytics, data collected as visitors access a website from a mobile phone is analyzed to determine, for example, which aspects of a website work best for mobile traffic and which mobile marketing campaigns work best for a business. Data collected as part of mobile analytics can include, for example, page views, visits, visitors, and countries, as well as information specific to mobile devices, such as device model, manufacturer, screen resolution, device capabilities, service provider, and preferred user language.

As used herein, the term "mobile security" refers to the protection of mobile devices, such as, for example, smartphones, tablets, laptops and other portable computing devices, and the networks they connect to, from threats and vulnerabilities associated with wireless computing. Different security counter-measures can be applied to mobile devices, from security in different layers of software, to the dissemination of information to end users, in order to safeguard personal and business information on a mobile device.

As used herein, the term "mobile application container" refers to an authenticated, encrypted area of a user's mobile device that can be used to separate and secure a portion of a device's storage from the rest of the device. A goal of containerization is to isolate an application to prevent malware, intruders, system resources or other applications from interacting with an application and any of its sensitive information secured by the container.

As used herein, the term "rapid mobile development platform" refers to a platform for fast development of mobile applications using, for example, a proprietary software development kit (SDK) or available mobile development frameworks.

FIG. 1 is a block diagram illustrating an architecture for an enterprise mobility platform 100, according to an exemplary embodiment of the invention. The enterprise mobility platform 100 includes a mobile analytics component 101, a mobile application management (MAM)/mobile device management (MDM) component 102, a file sync and share component 103, a mobile application container component 104, rapid mobile development platform component 105, an integration adapter 106, application templates 107, a security component 108, a virtualization component 109, and a converged infrastructure 110.

The mobile analytics component 101 provides analytics capabilities as outlined above. For example, the mobile analytics component 101 is configured to study the behavior of mobile users, by, for example, collecting data as visitors access a website from a mobile phone, and analyzing the data to determine, for example, which aspects of a website work best for mobile traffic and which mobile marketing campaigns work best for a business. The collected data includes, for example, page views, visits, visitors, and countries, as well as information specific to mobile devices, such as device model, manufacturer, screen resolution, device capabilities, service provider, and preferred user language.

The mobile analytics component 101 further evaluates data, including but not limited to, results, such as laboratory, clinical and research results, records, such as patient health and customer records, insurance policies, standard operating procedures, x-rays, scans and other images, deals, sales metrics, and pricing information, to develop conclusions concerning, for example, treatment effectiveness, real-time patient management, electronic health record (EHR) analytics, sales effectiveness, marketing campaign analysis and customer buying behavior.

The mobile analytics component 101 can include, but is not limited to, PIVOTAL® analytics software, available from Pivotal Software, Inc. of Palo Alto, Calif.

The MAM/MDM component 102 provides application and device management capabilities as outlined above. For example, the MAM/MDM component 102 is configured to permit acquisition, distribution and tracking of mobile applications in a secure environment. The MAM/MDM component 102 is further configured to enable entities to obtain, build, distribute and secure applications for their organization. The MAM/MDM component 102 is also configured to manage, secure and update mobile devices. The MAM/MDM component 102 can be configured to manage interactions between the mobile device management and mobile application management products, and can include, but is not limited to AirWatch® mobile device management and mobile application management software, available from VMware, Inc. of Palo Alto, Calif. The MAM/MDM component 102 is illustrated as being a combined MAM and MDM component. However, the MAM and MDM components may also be separate components that interact with each other.

The file sync and share component 103 permits users (e.g., employees) to use their own devices to access organizational data. For example, users can access files anywhere, anytime and from a variety of endpoint devices, and sync organizational data across multiple devices via the file sync and share component 103. The file sync and share component 103 can include, but is not limited to, SYNCPLICITY® software, available from Syncplicity, LLC of Santa Clara, Calif.

The mobile application container component 104 provides each user with an authenticated, encrypted area of their mobile device that can be used to separate and secure a portion of a device's storage from the rest of the device. The mobile application container component 104 can include, but is not limited to AirWatch® workspace management software, available from VMware, Inc. of Palo Alto, Calif. The rapid mobile development platform component 105 provides users with a platform for fast development of mobile applications using, for example, a proprietary software development kit (SDK) or available mobile development frameworks.

The integration adapter 106 provides support for social platforms and/or document management platforms, such as DOCUMENTUM® commercially available from EMC Corporation of Hopkinton, Mass., by, for example, providing integration to social and/or document management platforms in cases where organizations want to develop applications and need to be integrated with social media sites and/or with document management solutions for content management purposes. In accordance with embodiments of the invention, integration adapters can be software adapters, for example, a social integration application programming interface (API) and/or a document management platform API, which are exposed for developers to consume. These APIs can be part of a mobile development platform which provides an SDK for mobile development, an API for document integration, and an API for social media integrations. In accordance with an embodiment of the present invention, each of these APIs will be part of the enterprise mobility platform, providing a unified experience for customers.

The application templates 107 can be customizable to meet at least one industry specific issue in at least one of retail, healthcare, banking, travel, transport and telecommunications. For example, in accordance with an embodiment of the present invention, if an entity, such as a user or organization wants to build an application related to a specific industry, for example, retail, healthcare, banking, travel, transport or telecommunications, as noted above, the enterprise mobility platform 100 provides templates which are used in each respective industry.

The security component 108 provides protection for mobile devices, and the networks they connect to, from threats and vulnerabilities associated with wireless computing. The security component can provide, for example, different security counter-measures that can be applied to mobile devices, such as security in different layers of software and security in the dissemination of information to end users, in order to safeguard personal and business information on a mobile device. The security component 108 can include, but is not limited to, RSA® mobile security software, such as SecurID® mobile SDK, available from EMC Corporation of Hopkinton, Mass.

The virtualization component 109 provides, for example, software and hardware components having virtual compute, virtual storage and virtual network capabilities. The virtualization component is more particularly described below in connection with FIG. 2A including virtualization component 208, FIG. 2B including hypervisor 253, and FIG. 4 including virtual machines (VMs) 402-1, 402-2, . . . 402-M implemented using a hypervisor 404. In accordance with an embodiment, the virtualization component 109 is operatively coupled to and/or can be integrated into the converged infrastructure 110.

The converged infrastructure 110 includes a plurality of information technology (IT) components grouped into a single, optimized computing package. In accordance with embodiments of the present invention, components of a converged infrastructure may include an organization's computing, storage, and networking environments, such as servers, data-storage devices, networking equipment and software for IT infrastructure management, automation and orchestration. A converged infrastructure solution, in accordance with an embodiment of the present invention can be virtualization-friendly and cloud-ready.

The components of the platform 100 can be operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

According to an embodiment of the present invention, the converged infrastructure 110 includes an integration management component 111, which manages the interaction between and convergence of the various components 101-109 of the enterprise mobility platform 100. The integration management component 111 is configured to organize the interfacing of the components 101-109 with each other on the unified platform, and to address any issues and/or conflicts that may arise from running the components 101-109 on the same platform. Although illustrated as part of the converged infrastructure 110, the integration management component 111 can also be a separate component of the enterprise mobility platform 100.

In a non-limiting illustrative example, the platform 100 can be applied in the healthcare field, where the MAM/MDM component 102, for example, manages corporate owned devices and mobile applications on corporate, employee and patient owned devices. The mobile application container component 104 provides an enterprise container for mobile applications that is configured to host public and private mobile applications, which, in conjunction with at least the file sync and share and security components 103, 108, enables users on the corporate, patient and employee owned devices to securely view emails and content, such as laboratory results, patient health records and insurance policies. In addition, at least the file sync and share, mobile application container and security components 103, 104 and 108 permit secure exchange between any two of corporate, patient and employee owned devices of, for example, patient records, x-rays, scans and other images, standard operating procedures and clinical and research results. The platform 100 can also provide push notifications/alerts such as, for example, new assignment and emergency alerts for employees and appointment alerts for patients. In addition, the analytics component 101, based on, for example, the secure emails and content, such as laboratory results, patient health records, insurance policies x-rays, scans and other images, standard operating procedures and clinical and research results, can provide mobile analytics and data analysis concerning, for example, treatment effectiveness, real-time patient management and electronic health record (EHR) analytics.

In a non-limiting illustrative example, the platform 100 can be applied in the retail field, where the MAM/MDM component 102, for example, manages corporate owned devices and mobile applications on corporate, employee and customer owned devices to manage, for example, warehousing, order fulfillment, field services, delivery and installation of products. The mobile application container component 104 provides an enterprise container for mobile applications that is configured to host public mobile applications, such as manager tools, and private mobile applications, such as merchandise locators. The mobile application container component 104, in conjunction with at least the file sync and share and security components 103, 108, enables users on the corporate, customer and employee owned devices to securely view emails and content, such as customer records, new deals and sales metrics. In addition, at least the file sync and share, mobile application container and security components 103, 104 and 108 permit secure exchange between any two of corporate, customer and employee owned devices of, for example, new pricing and deals information. The platform 100 can also provide push notifications/alerts such as, for example, task assignments and emergency alerts for employees, and marketing campaigns for customers. In addition, the analytics component 101, based on, for example, the secure emails and content, such as customer records, new deals, sales metrics, new pricing and deals information, can provide mobile analytics and data analysis concerning, for example, sales effectiveness, marketing campaign analysis and customer buying behavior.

In the above illustrative and other examples, the platform 100 supports a bring your own device (BYOD) scenario, where employees and other users are allowed to use their personal mobile devices to access enterprise data and systems.

As can be understood from the above illustrative use examples, the integration management component 111 enables and controls exchange of and access to data between, for example, the analytics component 101 and at least one or more of the MAM/MDM, file sync and share, mobile application container and security components 102, 103, 104 and 108 so that the analytics component 101 can perform mobile analytics and data analysis on relevant data. In addition, the analytics component 101 may analyze data from social platforms and/or document management platforms accessed via the integration adapter 106. The results of the mobile analytics and data analysis can be provided to, for example, the file sync and share and mobile application container components 103, 104. The security component 108 can provide permissions to the analytics component 101 to access data needed for analysis from the MAM/MDM, file sync and share, mobile application container components 102, 103, 104, and any other components of the platform 100.

The MAM/MDM component 102 can interact with, for example, the analytics, file sync and share, mobile application container, security components 101, 103, 104, 108 and any other components of the platform 100 to provide push notifications to users, and to access data and/or receive permissions needed for managing corporate owned devices and mobile applications on corporate, employee, patient and customer owned devices. Also, the MAM/MDM component 102 can interact with, for example, the rapid development platform component 105 for fast development of mobile applications, and with the application templates component 107 to retrieve templates to build an application related to a specific industry. In addition, MAM/MDM component 102 can interact with the integration adapter 106 when using data from social platforms and/or document management platforms to develop applications.

The file sync and share component 103 coordinates permissions with, for example, the mobile application container and security components 104, 108 so that secure emails and content can be exchanged between users on the corporate, customer, patient and/or employee owned devices.

Figure 2B:
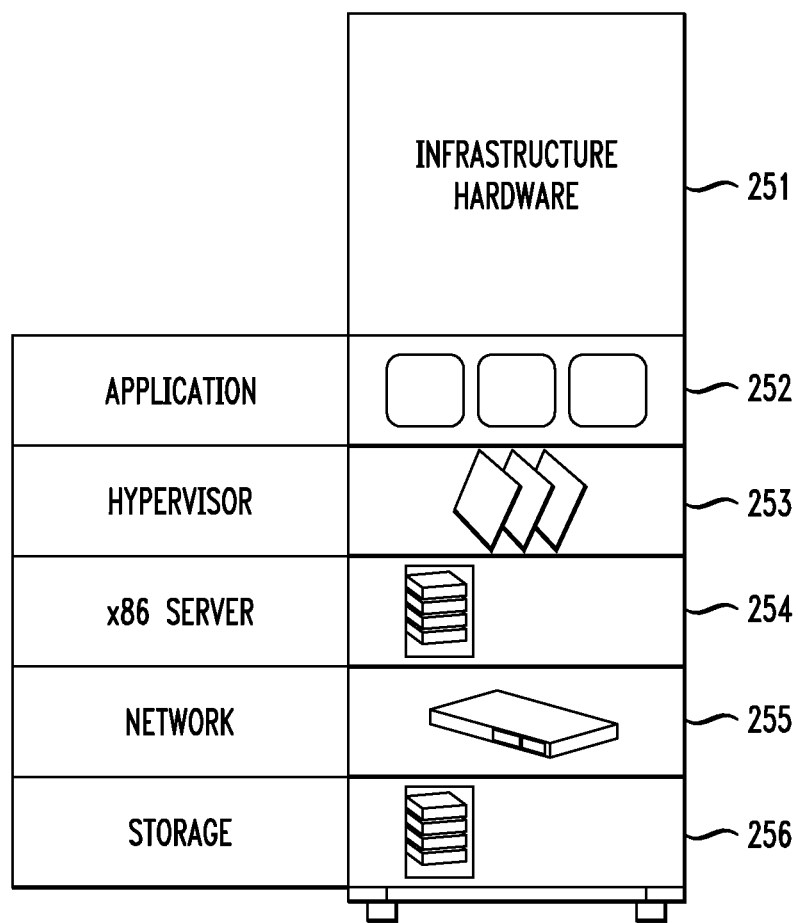

FIGS. 2A and 2B are block diagrams illustrating virtualization and converged infrastructure environments for an enterprise mobility platform, according to embodiments of the invention. For example, FIG. 2A depicts virtualization and converged infrastructure hardware, for example, VBLOCK® infrastructure hardware commercially available from EMC Corporation of Hopkinton, Mass., which includes virtualization, computing, network and storage components 208, 210, 212 and 214. The environment 200 includes presentation devices 202 for user access, application middleware servers 204, and management and database servers 206 operatively connected to the virtualization, computing, network and storage components 208, 210, 212 and 214. In accordance with embodiments of the invention, the presentation devices 202 for user access can include, but are not limited to, mobile applications, web applications and front end analytics applications. The application middleware servers 204 can include, but are not limited to, APACHE™ server software, available from The Apache Software Foundation of Forest Hill, Md., ORACLE® WEBLOGIC® server software, available from Oracle International Corporation of Redwood Shores, Calif., and JBOSS® Java® application server software, available from Red Hat, Inc. of Raleigh, N.C. The database servers 206 can include, but are not limited to, GREENPLUM® database management software, available from Pivotal Software, Inc. of Palo Alto, Calif., ORACLE® database management software, available from Oracle International Corporation of Redwood Shores, Calif., and SQL SERVER® database management software, available from Microsoft Corporation of Redmond, Wash. The environment 200 may be used by large capital organizations. The virtualization component 208 may include a commercially available hypervisor platform as discussed below in connection with FIG. 4.

FIG. 2B depicts another virtualization and converged infrastructure environment for an enterprise mobility platform, according to an embodiment of the invention. For example the virtualization and converged infrastructure environment 250 of FIG. 2B can include infrastructure hardware 251, for example, VSPEX® infrastructure hardware commercially available from EMC Corporation of Hopkinton, Mass., built on commodity hardware layers, including, for example, application, hypervisor, server (e.g., x86), network and storage layers 252, 253, 254, 255 and 256 provided by different vendors. The environment 250 may be used by smaller capital companies or companies who want to utilize their existing vendor hardware. In both FIGS. 2A and 2B, software components of the enterprise mobility platform can remain the same, while the underlying hardware differs.

FIG. 3 is a flow chart showing a method for providing a unified and secured enterprise mobility platform, in accordance with an embodiment of the present invention. Unless otherwise stated, the order or number of steps set forth in FIG. 3 is not necessarily limited to what is shown, and may be subject to change. It should be understood that the structure of the flow chart set forth in FIG. 3 be viewed as exemplary rather than as a requirement or limitation of the invention.

Referring to FIG. 3, the method 300 comprises, at block 302, implementing a mobile device management component, a mobile application management component, a file syncing component and a file sharing component on a unified platform, and at block 304, implementing a mobile analytics component on the unified platform. The method 300 further comprises, at block 306, implementing a mobile security component on the unified platform, and at block 308, implementing a mobile application container on the unified platform. In accordance with an embodiment of the present invention, the mobile security component is capable of providing tamper protection for a mobile device.

The method may further comprise, at block 310, managing interactions between at least two of the mobile device management component, the mobile application management component, the file syncing component, the file sharing component, the mobile analytics component, the mobile security component and the mobile application container on the unified platform.

The method may further comprise implementing at least one configurable integration adapter on the unified platform, wherein the at least one configurable integration adapter supports at least one of a social network platform and a document management platform, such as, for example, a platform for storing content in a repository.

As used herein, the term "content" refers to data or information. By way of example only, the data or information may be multimedia data, data of a single medium, streaming data, non-streaming data, etc. Embodiments of the invention are not limited to any particular type of content.

The method may further comprise loading the unified platform with a rapid mobile development platform and/or at least one customizable application template. The customizable application template can be customized to meet at least one industry specific issue in, for example, retail, healthcare, banking, travel, transport and/or telecommunications.

The method may also comprise managing interactions between at least two of each of the components, MAC, integration adapter, rapid mobile development platform and the customizable application template implemented on the unified platform.

According to an embodiment of the invention, the mobile device management, mobile application management, file syncing and file sharing components comprise software products including one or more application programs running on a virtualization infrastructure. The mobile analytics, mobile security and mobile application container components, as well as the configurable integration adapter, rapid mobile development platform and the customizable application template may also comprise software products including one or more application programs running on a virtualization infrastructure.

Figure 4:
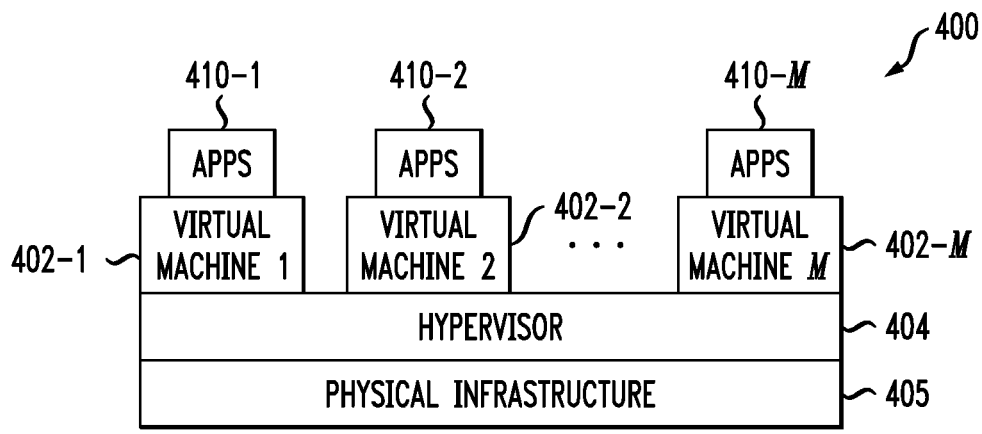
FIGS. 4 and 5 show examples of processing platforms that may be utilized to implement at least a portion of the architecture or environments of FIGS. 1, 2A and 2B.

As shown in FIG. 4, the cloud infrastructure 400 comprises virtual machines (VMs) 402-1, 402-2, . . . 402-M implemented using a hypervisor 404. The hypervisor 404, as mentioned above, is an example of what is more generally referred to herein as "virtualization infrastructure." The hypervisor 404 runs on physical infrastructure 405 (e.g., such as may include CPUs and/or storage devices). The cloud infrastructure 400 further comprises sets of applications 410-1, 410-2, . . . 410-M running on respective ones of the virtual machines 402-1, 402-2, . . . 402-M (utilizing associated logical units (LUNs)) under the control of the hypervisor 404.

Although only a single hypervisor 404 is shown in the example of FIG. 4, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 404 which, as shown in FIG. 4, is directly inserted on top of the computer hardware in order to allocate hardware resources of the physical computer (physical infrastructure 405) dynamically and transparently. The hypervisor 404 affords the ability for multiple operating systems to run concurrently on a single physical computer and share hardware resources with each other. The hypervisor 404 thus also manages disk I/O scheduling associated with the workloads performed by each virtual machine.

An example of a commercially available hypervisor platform that may be used to implement portions of the cloud infrastructure 400 in one or more embodiments of the invention is the VMware® vSphere® which may have an associated virtual infrastructure management system such as the VMware® vCenter™. The underlying physical infrastructure 405 may comprise one or more distributed processing platforms that include storage products such as VNX® and Symmetrix® VMAX, both commercially available from EMC Corporation of Hopkinton, Mass. A variety of other storage products may be utilized to implement at least a portion of the cloud infrastructure 400.

Figure 5:
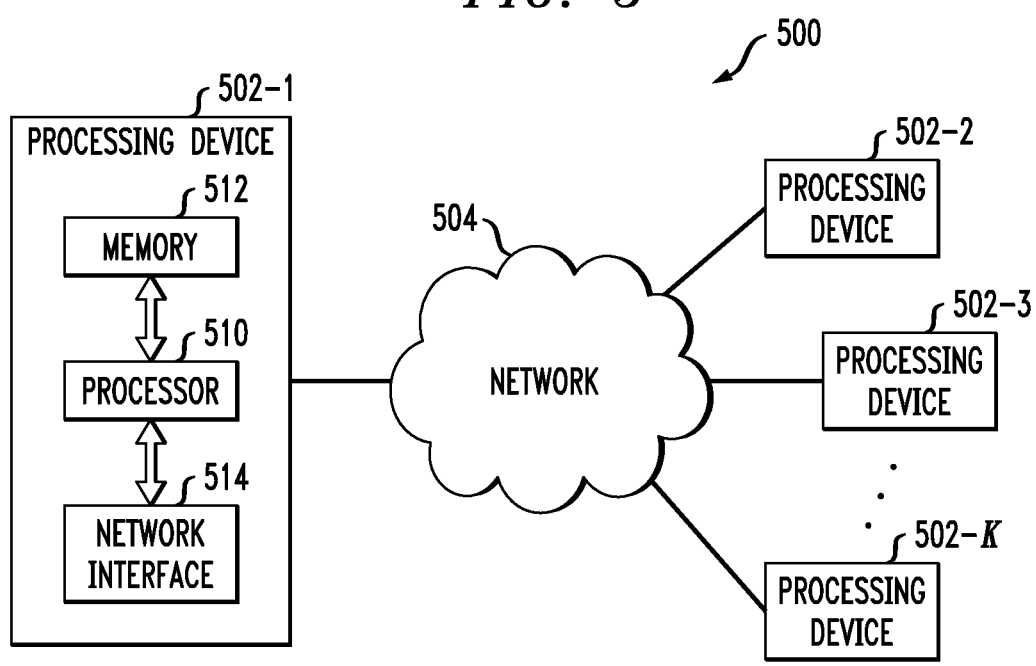

An example of a processing platform on which the cloud infrastructure 400 and/or the enterprise mobility platform of FIG. 1 may be implemented is processing platform 500 shown in FIG. 5. The processing platform 500 in this embodiment comprises at least a portion of the architecture of enterprise mobility platform 100 and environments 200 and 250, and includes a plurality of processing devices denoted 502-1, 502-2, 502-3, . . . 502-K, which communicate with one another over a network 504. One or more of the elements of the architecture of enterprise mobility platform 100 and of environments 200 and 250 may therefore each run on one or more computers or other processing platform elements, each of which may be viewed as an example of what is more generally referred to herein as a "processing device." As illustrated in FIG. 5, such a device generally comprises at least one processor 510 and an associated memory 512, and implements one or more functional modules for controlling certain features of the architecture of enterprise mobility platform 100 and of environments 200 and 250. Again, multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein (e.g., components 101-110) can be implemented at least in part in the form of one or more software products including software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the elements of the architecture of the enterprise mobility platform 100 and/or of environments 200 and 250. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the server with the network 504 and other system components. Such circuitry may comprise conventional transceivers of a type well known in the art.

The other processing devices 502 of the processing platform 500 are assumed to be configured in a manner similar to that shown for processing device 502-1 in the figure.

The processing platform 500 shown in FIG. 5 may comprise additional known components such as batch processing systems, parallel processing systems, physical machines, virtual machines, virtual switches, storage volumes, logical units, etc. Again, the particular processing platform shown in FIG. 5 is presented by way of example only, and the architecture of the enterprise mobility platform 100 and/or of environments 200 and 250 of FIGS. 1, 2A and 2B may include additional or alternative processing platforms, as well as numerous distinct processing platforms in any combination.

Also, numerous other arrangements of servers, computers, storage devices or other components are possible in the architecture of the enterprise mobility platform 100 and/or in environments 200 and 250. Such components can communicate with other elements of the architecture of the enterprise mobility platform 100 and/or of environments 200 and 250 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, in a non-limiting example, the embodiments of the invention provide techniques for providing a unified and secured enterprise mobility platform built on a converged infrastructure with mobile device management (MDM), mobile application management (MAM), file sync and share, mobile analytics and mobile security software components, and virtual compute, virtual storage, virtual network, and high performance and scale out hardware components.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    implementing a plurality of components on a unified platform associated with an entity, the plurality of components comprising:
        a mobile device management component configured to securely manage one or more mobile devices accessing the unified platform;
        a mobile application management component configured to securely manage one or more mobile applications on the one or more mobile devices;
        a file sync and share component configured to enable users to access entity data associated with the entity and sync the entity data across multiple devices; and
        a mobile security component configured to provide tamper protection for a mobile device;
    managing interactions between at least two of the plurality of components via an integration management component implemented on the unified platform, wherein managing the interactions comprises one or more of organizing interfaces between the plurality of components and resolving conflicts associated with implementing the plurality of components on the unified platform; and
    implementing at least one configurable integration adapter on the unified platform, wherein the at least one configurable integration adapter supports access by at least one auxiliary content management platform;
    wherein the plurality of components and the at least one configurable integration adapter of the unified platform are configured to execute on a virtualization layer executing on a converged infrastructure; and
    wherein the implementing and managing steps are executed via at least one processor coupled to a memory.

2. The method of claim 1, wherein the plurality of components further comprises a mobile analytics component configured to perform at least one of analyze mobile device usage data collected from the one or more mobile devices and analyze auxiliary content management data collected from the at least one auxiliary content management platform via the at least one configurable integration adapter.

3. The method of claim 1, wherein the plurality of components further comprises a mobile application container component configured to containerize a portion of storage of a given one of the one or more mobile devices.

4. The method of claim 1, wherein the at least one auxiliary content management platform comprises at least one of a social network platform and a document management platform.

5. The method of claim 1, further comprising loading the unified platform with a rapid mobile development platform.

6. The method of claim 1, further comprising loading the unified platform with at least one customizable application template.

7. The method of claim 6, wherein the at least one customizable application template is customized to meet at least one industry specific issue in at least one of retail, healthcare, banking, travel, transport and telecommunications.

8. The method of claim 1, wherein each of the plurality of components comprises software products including one or more application programs running on a virtualization infrastructure.

9. The method of claim 1, wherein the converged infrastructure comprises a plurality of information technology components, and wherein the plurality of information technology components comprise computing, storage and networking components.

10. An article of manufacture comprising a processor-readable storage medium having encoded therein executable code of one or more software programs, wherein the one or more software programs when executed by a processor device implement the steps of:
   implementing a plurality of components on a unified platform associated with an entity, the plurality of components comprising:
      a mobile device management component configured to securely manage one or more mobile devices accessing the unified platform;
      a mobile application management component configured to securely manage administration of one or more mobile applications on the one or more mobile devices;
      a file sync and share component configured to enable users to access entity data associated with the entity and sync the entity data across multiple devices; and
      a mobile security component configured to provide tamper protection for a mobile device;
   managing interactions between at least two of the plurality of components via an integration management component implemented on the unified platform, wherein managing the interactions comprises one or more of organizing interfaces between the plurality of components and resolving conflicts associated with implementing the plurality of components on the unified platform; and
   implementing at least one configurable integration adapter on the unified platform, wherein the at least one configurable integration adapter supports access by at least one auxiliary content management platform;
   wherein the plurality of components and the at least one configurable integration adapter of the unified platform are configured to execute on a virtualization layer executing on a converged infrastructure.

11. The article of manufacture of claim 10, wherein the plurality of components further comprises a mobile analytics component configured to perform at least one of analyze mobile device usage data collected from the one or more mobile devices and analyze auxiliary content management data collected from the at least one auxiliary content management platform via the at least one configurable integration adapter.

12. The article of manufacture of claim 10, wherein the plurality of components further comprises a mobile application container component configured to containerize a portion of storage of a given one of the one or more mobile devices.

13. An apparatus comprising:
   a memory; and
   a processor operatively coupled to the memory and configured to:
      implement a plurality of components on a unified platform associated with an entity, the plurality of components comprising:
         a mobile device management component configured to securely manage one or more mobile devices accessing the unified platform;
         a mobile application management component configured to securely manage administration of one or more mobile applications on the one or more mobile devices; and
         a file sync and share component configured to enable users to access entity data associated with the entity and sync the entity data across multiple devices; and
         a mobile security component configured to provide tamper protection for a mobile device;
      manage interactions between at least two of the plurality of components via an integration management component implemented on the unified platform, wherein the management of the interactions comprises one or more of an organization of interfaces between the plurality of components and a resolution of conflicts associated with implementing the plurality of components on the unified platform; and
      implement at least one configurable integration adapter on the unified platform, wherein the at least one configurable integration adapter supports access by at least one auxiliary content management platform;
      wherein the plurality of components and the at least one configurable integration adapter of the unified platform are configured to execute on a virtualization layer executing on a converged infrastructure.

14. The apparatus of claim 13, wherein the plurality of components further comprises a mobile analytics component configured to perform at least one of analyze mobile device usage data collected from the one or more mobile devices and analyze auxiliary content management data collected from the at least one auxiliary content management platform via the at least one configurable integration adapter.

15. The apparatus of claim 13, wherein the plurality of components further comprises a mobile security component.

16. The apparatus of claim 13, wherein the plurality of components further comprises a mobile application container component configured to containerize a portion of storage of a given one of the one or more mobile devices.

17. The apparatus of claim 13, wherein the processor is further configured to load the unified platform with a rapid mobile development platform.

18. The apparatus of claim 13, wherein the processor is further configured to load the unified platform with at least one customizable application template.

19. The apparatus of claim 13, wherein each of the plurality of components comprises software products including one or more application programs running on a virtualization infrastructure.

20. The apparatus of claim 13, wherein the at least one auxiliary content management platform comprises at least one of a social network platform and a document management platform.

* * * * *